United States Patent Office 2,994,022
Patented July 25, 1961

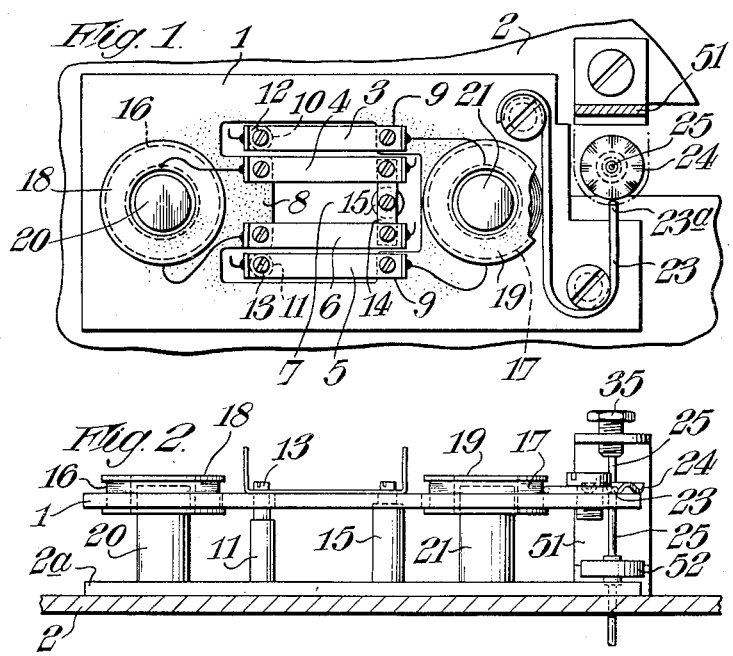
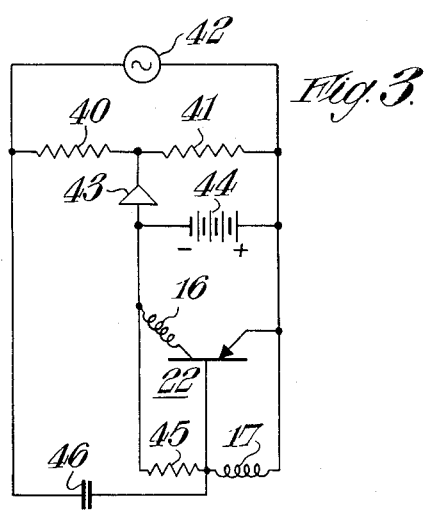

2,994,022
ELECTRO-MECHANICAL OSCILLATORS
Cecil Frank Clifford, New Bridge Works, Bath, England
Filed Dec. 19, 1958, Ser. No. 781,673
Claims priority, application Great Britain Jan. 17, 1958
8 Claims. (Cl. 318—132)

This invention relates to electro-mechanical oscillators having an electrically maintained mechanical oscillating member and to motors and escapement mechanisms employing these oscillators.

The object of the invention is to provide an improved oscillator of the above-mentioned type and motor and escapement mechanisms employing the improved oscillator.

According to the present invention, an electro-mechanical oscillator comprises a mechanical member adapted to be electrically maintained in oscillation by a transistor amplifier and also comprises signal and driving coils. The signal coil is arranged to develop an induced signal as the mechanical member oscillates and is connected to supply a signal to the input of the transistor amplifier; the driving coil is energised from the output of the transistor amplifier. The power supply for the transistor amplifier is derived from a storage battery which is arranged so as to be chargeable from an alternating current supply and means are provided for supplying a further signal to the input of the transistor amplifier from the alternating current supply, whereby the frequency of oscillation of the mechanical member is substantially synchronised to the alternating current supply frequency. The alternating current supply is normally an A.C. supply mains.

Such an oscillator has the advantage that it can be maintained at the supply mains frequency so long as the mains are connected but, in the event of failure or disconnection of the supply mains, the oscillator is self-running at its natural frequency, which, in all practical cases, is very close to its frequency when synchronised to the supply mains. During the time power is not supplied from the supply mains, driving power for the oscillator is available from the storage battery.

Such an oscillator offers obvious advantages as a master oscillator over an oscillator which is solely mains driven. Such an oscillator may form part of an escapement mechanism of a clockwork, so providing a clock which is mains-controlled when the supply mains are connected but continues to keep time when the supply mains fail or are disconnected for a limited period.

Such an oscillator may further form part of a constant-speed motor which similarly is mains-controlled when the supply mains are connected and is self-running at substantially the same speed for a further period thereafter.

Conveniently, the signal and driving coils are mounted on the mechanical member, and oscillate therewith in a magnetic field. This magnetic field may be provided by arranging the coils so that they oscillate adjacent the ends of fixed permanent magnets or the fixed poles or pole pieces of a permanent magnet system.

Conveniently also, the transistor amplifier has the signal coil connected in its emitter-base circuit and the driving coil connected in series with a resistor in its collector-base circuit, one pole of the alternating current supply being connected to the transmitter emitter electrode and the other pole of the supply being connected by way of an impedance to the transistor base electrode.

It is preferred to use an oscillating mechanical member in the form of a plate which is mounted so as to oscillate about a transverse axis in the plane of the plate and the signal coil and the driving coil are mounted on the plate at opposite sides of the axis of oscillation.

In order that the invention may be readily carried out, a preferred embodiment of an electro-mechanical oscillator according to the invention will now be particularly described, by way of example, with reference to the accompanying drawings and the application of the oscillator to either a motor mechanism or to an escapement mechanism will be explained.

In the accompanying drawings:

FIG. 1 shows a plan view of an oscillator according to the invention;

FIG. 2 shows in side elevation the oscillator shown in FIG. 1 and

FIG. 3 is a circuit diagram showing the circuit arrangement of the oscillator of FIGS. 1 and 2.

The oscillator unit of the motor shown in detail in FIGS. 1 and 2 has, as the oscillating mechanical member, a flat rectangular plate of insulating material 1 attached to a heavy base plate 2 by four leaf springs 3, 4, 5 and 6. These springs are permitted to flex so that the plate 1 oscillates with a vibratory, see-saw movement about a transverse axis passing approximately through the centre of the plate and the centre of the four springs.

The plate has an irregular shaped aperture 7 at its centre. This is generally of rectangular shape but has a tongue 8 extending inwardly from one end and lands 9 left at the corner opposite this end.

The four leaf springs 3, 4, 5 and 6 are made of "Ni Span C" metal of about 0.004" thickness. These are arranged parallel to each other, in the same plane when in the unflexed condition, and lie within the aperture 7 in the oscillating plate 1.

The two outer springs 3 and 5 of the four are supported on the top of two insulating pillars 10 and 11. The pillars are mounted on the baseplate 2 perpendicularly thereto and the springs are secured to the tops of the pillars by screws 12 and 13 respectively. The other ends of the springs are secured to the lands 9 at the corners of the oscillating plate aperture 7. The two inner springs 4 and 6 are attached at their corresponding ends to the tongue 8 of the oscillating plate aperture and at their respective other ends to a bridge 14 carried on the top of a further pillar 15 mounted on the baseplate.

In this arrangement it is necessary for the leaf springs 3, 4, 5 and 6 all to have the same working length and for the fixing screws 12 and 13 to have the same diameter heads. Similarly, the supporting pillars 10, 11 and 15 also have the same diameter.

At opposite ends of the oscillating plate are mounted two coils 16 and 17, each approximately 11.5 mm. diameter and 4 mm. thick, having an internal diameter of 5.5 mm. Each coil is wound on a plastic former 18 and 19 respectively and comprises 2,000 turns of 48 S.W.G. enamel covered copper wire. The coil 17 is a signal coil and the coil 16 a driving coil.

Two cylindrical permanent magnets 20 and 21 (4.7 mm. diameter) of the material sold under the registered trade mark "Ticonal" are mounted in the baseplate, extending through the baseplate to the underside thereof. These magnets have opposite poles projecting upwards from the baseplate and passing through the ends of the oscillating plate one inside each of the coils 16 and 17 mounted thereon. Above the baseplate 2, the ends of two magnets 20, 21 are bridged by a soft iron bar 2a, so that the two magnets 20, 21 and the soft iron bar 2a form part of a single magnetic circuit producing a magnetic field in the region of the signal and driving coils 16 and 17.

The leaf springs 3, 4, 5 and 6 serve both as the resilient supports for the oscillating plate and as conductors from terminals fixed relatively to the baseplate, to the signal and driving coils. To this end, the extremities of the leaf springs are bent up to form soldering tags, the signal coil 17 being connected to the ends of one pair of springs 4 and 6 and the driving coil 16 to the other pair 3 and 5.

Referring now to FIG. 3, which shows the electrical connections between various parts described with reference to FIGS. 1 and 2, the signal coil 17 is connected in the emitter-base circuit of a junction type transistor amplifier 22 and the driving coil 16 is connected in the collector-base circuit of the amplifier in series with a resistor 45 of value 39 K. ohms. The junction of the driving coil 16 and resistor 45 is connected to the negative pole of a D.C. source 44, which is a 6 volt rechargeable battery. The positive pole is connected to the transistor emitter.

An alternating current source 42, which may conveniently be a 50 c./s. A.C. supply mains, has one pole connected to the positive pole of the D.C. source 44 and is bridged by a potentiometer comprising series-connected resistors 40 and 41. The junction of resistors 40 and 41 is connected to the negative pole of the D.C. source 44 through a rectifier 43 connected in the conducting sense to provide a charging current to the D.C. source 44.

The pole of the A.C. supply 42 which is not connected to the transistor emitter is connected through a capacitor 46 to the junction of the signal coil 17 and resistor 45. The value of resistor 45 can be critically determined so that plate 1 begins to oscillate when the supply 42 is connected.

As explained above, the signal coil 17 is connected to the input of the transistor amplifier 22 while the driving coil 16 is supplied from the output thereof. Thus, as the plate 1 oscillates, the signal coil 17 oscillates relatively to the magnet 21 passing through the centre of the coil. A substantially sinusoidal voltage is thus induced in the signal coil 17 which provides an input current to the transistor 22. An amplified current then flows in the transistor output through the driving coil 16, which is so phased in relation to the polarity of the magnet pole 20 passing through the centre of the coil as to add the movement of the oscillator producing the signal. In this way, the oscillator is electrically maintained, the driving power being derived from the D.C. source 44 supplying the transistor.

The oscillating mechanical system comprising the plate 1, the parts mounted thereon and the springs 3, 4, 5 and 6 has a natural frequency of vibration approximately, but not necessarily exactly, equal to the frequency of the supply mains 42, in this example 50 c./s. A small current from the A.C. supply 42 flows through the series circuit comprising the capacitor 46 and the signal coil 17. This current provides an input to the transistor 22, so that the frequency of oscillation of the oscillator is locked to the A.C. supply frequency.

In the event of failure of the A.C. supply 42 or its temporary disconnection from circuit, the oscillator continues in operation at its natural frequency, the driving power being supplied from the storage battery 44.

As indicated earlier, the oscillator of the present invention may be used solely as an oscillator or it may be embodied in a motor mechanism or in an escapement mechanism. Referring again to FIGS. 1 and 2, there is mounted on the oscillating plate 1 an S-shaped wire permanent magnet 23. One end 23A of the permanent magnet overlaps a stepped portion of the plate 1 so that its tip faces the circumferential edge of a crinkled washer rotor 24 made of magnetic material. The crinkled form of the rotor 24 is such as to provide an undulating circumferential edge which presents, by rotation of the rotor, a substantially sinusoidal magnetic track in front of the tip 23A of the magnet 23.

The rotor 24 is mounted on a spindle 25. The spindle 25 is rotatably mounted between pivots carried in a bracket 51, the upper pivot being shown at 35 in FIG. 2, and the lower one (not shown) lying below the plate 2. The spindle 25 extends through the base plate 2 and, in the embodiment shown in FIG. 2, carries a small flywheel 52 which is loosely mounted on the spindle 25.

The magnet 23 and rotor 24 form part of drive means when the oscillator is used as part either of a motor or of an escapement mechanism. If the spindle 25 is lightly driven, its free rotation is restrained by the magnetic attraction between the tip 23A of the magnet 23 and the magnetic track of the rotor 24. As the tip 23A oscillates with the oscillating plate 1, the magnetic track is permitted to rotate at a speed corresponding to the frequency of oscillation of the magnet tip 23A. The rotational speed of the rotor 24 is then controlled by the frequency of oscillation of the oscillating plate 1.

In the case of a motor, the rotor 24 is caused to rotate as the magnet tip 23A oscillates with the oscillating plate 1. In this case, the spindle 25 is rotated at a speed corresponding to the frequency of oscillation of the plate 1. The drive imparted to the rotor 24 is the same in either direction of rotation, so that the rotor may commence to rotate and be driven in either sense. If one direction of rotation is preferred, a device which permits rotation only in the preferred direction is embodied in the drive. Since the amount of power transmitted from the magnet 23 to the rotor 24 is small, the spindle 25 will normally be connected to drive a speed reduction gearing.

I claim:

1. An electromechanical oscillator comprising an oscillatory member adapted to oscillate about an axis, a signal coil and a driving coil associated with said member, means to produce a magnetic field through each said coil, a transistor amplifier having its input connected to the signal coil and its output connected to the driving coil, a secondary battery to supply power to said amplifier, an alternating current supply, the natural frequency of oscillation of said member being substantially the same as the frequency of said supply, rectifier means to charge said battery from said supply, and means to apply an additional signal from said supply to the input of said amplifier, whereby said member is made to oscillate at the frequency of said supply.

2. An electromechanical oscillator as claimed in claim 1 in which said signal and driving coils are mounted on said member and oscillate therewith.

3. An electromechanical oscillator as claimed in claim 2 comprising at least one permanent magnet, said signal and driving coils oscillating in the magnetic field set up thereby.

4. An electro-magnetic oscillator comprising an oscillatory member, spring means supporting said member for oscillation about an axis, signal and driving coils mounted on said member on opposite sides of said axis, magnet means to produce a magnetic field through said coils, a transistor amplifier, the signal coil being connected in the emitter-base circuit and the driving coil being connected in series with a resistor in the collector-base circuit of said transistor amplifier, a secondary battery to supply power to said amplifier, an alternating current supply, the natural frequency of oscillation of said member being substantially equal to the frequency of said supply, rectifier means to charge said battery continuously from said supply, a connection from one pole of said supply to the transistor emitter electrode, an impedance, and a connection from the other pole of said supply to the transistor base electrode through said impedance, whereby said member oscillates at the frequency of said supply.

5. An electro-magnetic oscillator as claimed in claim 4 comprising a voltage divider across said supply, said battery and said rectifier means being connected in series between said one pole of said supply and a tapping on said voltage divider, said battery also being connected between said transistor emitter and collector electrodes.

6. An electro-magnetic oscillator as claimed in claim 4 in which said oscillatory member comprises a plate supported by said spring means to oscillate about an axis lying in the plane of said plate.

7. An electro-magnetic oscillator as claimed in claim 4 comprising a rotary member, and drive means associated with said oscillatory member and said rotary member for translating oscillatory motion into rotary motion.

8. An electro-magnetic oscillator as claimed in claim 7 wherein said drive means comprises a permanent magnet mounted on said oscillatory member, and said rotary member comprises a crinkled washer presenting an undulating circumferential track to the tip of said magnet.

References Cited in the file of this patent

UNITED STATES PATENTS

| | | |
|---|---|---|
| 2,475,200 | Roys | July 5, 1949 |
| 2,675,490 | Portail | Apr. 13, 1954 |
| 2,877,399 | Shaull | Mar. 10, 1959 |